United States Patent [19]

Gaul et al.

[11] Patent Number: 4,692,632
[45] Date of Patent: Sep. 8, 1987

[54] PROCEDURE AND APPARATUS FOR UNINTERRUPTIBLE POWER SUPPLY

[75] Inventors: Hartmut Gaul, Roettenbach; Hermann Mickal, Erlangen; Adolf Haboeck, Roettenbach, all of Fed. Rep. of Germany

[73] Assignee: Siemens Aktiengesellschaft, Berlin and Munich, Fed. Rep. of Germany

[21] Appl. No.: 832,925

[22] Filed: Feb. 24, 1986

[30] Foreign Application Priority Data

Feb. 25, 1985 [DE] Fed. Rep. of Germany ....... 3506572

[51] Int. Cl.$^4$ .................................................. H02J 9/06
[52] U.S. Cl. ........................................ 307/66; 307/64; 307/82; 363/49; 323/323
[58] Field of Search .................... 307/6, 7, 41, 42, 43, 307/45, 51, 52, 53, 57, 58, 59, 62, 63, 64, 66, 82, 87, 102, 103, 104; 363/49; 323/323, 209, 208, 218, 233

[56] References Cited

U.S. PATENT DOCUMENTS

| | | | |
|---|---|---|---|
| 3,120,634 | 2/1964 | Genuit | 363/49 |
| 3,315,146 | 4/1967 | Paice | 363/49 |
| 3,354,381 | 11/1967 | Temple | 363/49 |
| 3,413,539 | 11/1968 | Lopitzsch | 363/49 |
| 3,612,897 | 10/1971 | Kanngiesser | 307/87 |
| 3,614,461 | 10/1971 | Speer | 307/87 X |
| 3,876,922 | 4/1975 | Forstbauer | 307/66 X |
| 4,020,360 | 4/1977 | Udvardi-Lakos | 307/66 |
| 4,058,738 | 11/1977 | Udvardi-Lakos | 307/66 |
| 4,079,443 | 3/1978 | Udvardi-Lakoes et al. | 363/49 |
| 4,161,773 | 7/1979 | Szpakowski | 363/49 |
| 4,167,680 | 9/1979 | Gross | 307/66 |
| 4,195,233 | 3/1980 | Udvardi-Lakos | 307/87 X |
| 4,328,429 | 5/1982 | Kublick | 307/58 |
| 4,388,534 | 6/1983 | Love et al. | 307/66 |
| 4,471,420 | 7/1984 | Seeger | 363/49 X |

Primary Examiner—William M. Shoop, Jr.
Assistant Examiner—Shik Luen Paul Ip
Attorney, Agent, or Firm—Volker R. Ulbrich; John L. James

[57] ABSTRACT

To supply various loads connected to a uninterruptible bus, a power supply system N is connected (when functioning normally) by means of a mechanical switch, keeping an energy storage unit charged by means of a static converter which also functions preferably as a phase shifter to stabilize the supply voltage. In the event of a power system malfunction, the storage unit is discharged by means of the static converter arrangement, and the mechanical switch is opened. The opening of this switch is not critical since between the switch and uninterruptible bus there is an inductance arrangement and an auxiliary switch. In case of a power system malfunction (auxiliary switch open), a large inductance and its large corresponding impedance of the inductive impedance arrangement becomes effective which during proper operation of the power system is shunted. Thus, during proper operation of the system only low inductive impedances (11, 12) and their correspondingly low impedances are effective via which a high current can flow from power supply system N, which suffices to trigger the load unit fuses in the event of a load unit short-circuit thus allowing such loads to self disconnect and not interrupt the bus by dragging it down with a heavy current malfunction.

11 Claims, 2 Drawing Figures

PROCEDURE AND APPARATUS FOR
UNINTERRUPTIBLE POWER SUPPLY

BACKGROUND OF THE INVENTION

This invention relates to a procedure for operating an uninterruptible power supply of a.c. loads which monitors a source of a.c. voltage, stores energy, and in the event of a reduction of the source a.c. voltage, supplies alternating current from the stored energy through an inverter. The invention further relates to a device to carry out this procedure.

Many loads, particularly data processing devices, require a.c. voltage supplies whose frequency and amplitude can vary only within very limited tolerances. Even short-term interruptions of data processing devices will result in operating malfunctions. In the event of a power failure of the normal a.c. power supply provided by a power company, the voltage supply required for sensitive loads must be drawn from a charged energy storage unit, such as a battery, and converted by a static converter into the frequency and amplitude required to supply the load units; at the same time any return flow of the energy drawn from the storage unit back into the malfunctioning power supply network must be prevented.

For that reason standard uninteruptible power supply systems often contain a rectifier connected to the a.c. power supply network, which as long as the a.c. power supply network is operating properly, keeps the energy storage unit in a fully charged status. An inverter connected to the uninterruptible bus supplying the load units at the output of the energy storage unit supplies the uninterruptible voltage which is drawn from either the a.c. power supply network and then rectified or, in the event of a power failure the voltage is drawn from the energy storage unit.

In this known arrangement, no switchover procedures are required, but the rectifying and subsequent inversion of the supply voltage at all times during the proper function of the a.c. power supply network, however, produces a substantial energy loss. This loss is often manifested by the generation of undesired noise and heat.

Another known possibility is to supply the load units directly from the power supply system, as long as the latter is operating properly, with the a.c. to d.c. and d.c. to a.c. converter arrangement required only to keep the energy storage unit charged. In the event of a power failure, however, the converter unit must begin feeding the load units immediately. Assuming that the energy storage unit is connected to the uninterruptible bus by means of a converter enhanced for reversible operation, then by means of a monitoring unit which monitors the status of the a.c. power system, the energy consumption of the load units and the load status of the battery, a control function can be set up so that the energy storage unit is kept in charged condition as long as the a.c. power network functions properly, with the converter practically functioning in no-load operation. U.S. Pat. No. 4,020,360 describes an inverter whose power component, moreover, can be shut down and held ready to start given a properly functioning a.c. power network and a charged energy storage unit, and is capable of commutating immediately in case of a power failure in order to draw the required power from the energy storage unit. Thus, during normal operation no energy losses result due to energy conversion in the power component.

In order to maintain the voltage at the uninterruptible bus without either phase or amplitude shifts, it is, however, necessary that in the event of a power failure the control of the inverter arrangement begin operating immediately with the voltage control and phase position prevailing at that moment. For that purpose, for example, in accordance with U.S. Pat. No. 4,020,360, an inverter model can be designed which supplies such respective ignition pulses—depending upon the load status of the energy storage unit, the phase position of the load voltage as well as the instantaneously required load unit current—that, given a functional power component, would enable the converter to supply the required capacity in the proper phase to the energy storage unit, but with these ignition pulses remaining inhibited due to the shut-down power component of the inverter. Only in the event of a malfunction of the a.c. power supply network will ignition pulses be connected to the simultaneously started power component.

With this standby operation of the inverter or of its control arrangement, the uninterruptible bus is separated from the a.c. power supply network by means of a switch as soon as a power supply malfunction occurs and there is the danger of feedthrough into the malfunctioning network from the uninterruptible bus which is now supplied out of the energy storage unit. The resulting switchover times have to be very short. It is preferable if in this arrangement a filter connected to the uninterruptible bus is installed at or before the input of the load units, as in U.S. Pat. No. 3,999,078, which permits a buffering of the supply voltage as a short-term energy storage unit during the switchover time cycles. Said filter is also preferable in order to suppress voltage peaks and harmonic oscillations which are present in the a.c. power supply network or generated by the static converter operation.

The switch required to decouple the uninterruptible bus from the a.c. power supply network in the event of a system short-circuit is generally designed as an electronic switch in order the short switching times required. The current-carrying capacity of said electronic switches is, however, limited, i.e., in case of a short-circuit generated by the load units on the unterruptible bus, any surging short-circuit current which could result in a disruption of the electronic switch is not permissible. Thus, for example, a transformer is connected to the output of the electronic switch, which has two primary windings: the first one supplied from the a.c. power supply network over the switch, and the second one connected to the battery by means of a static converter. On the one hand said transformer limits the current flow from the a.c. power supply network to the interruptible bus, and on the other hand it permits a parallel supply of inductive-reactive current from the battery in the event that the system voltage, through present, is inadequate (or for that matter to reduce transitory system overvoltages by taking up inductive-reactive current), as well as, operation of the inverter as a voltage stabilizer.

The loads connected to the uninterruptible bus are generally protected by their own fuses so that, in the event of a malfunction, said loads do not convey a high short-circuit current onto the uninterruptible bus, thus leading to the breakdown of other loads similarly connected to the uninterruptible bus. Such fuses for the load units clearly have to be carefully designed with high sensitivity in accordance with the restrictive current-carrying capacity of the electronic switches utilized, or else they would induce high current levels to flow through the electronic switch, which would necessitate corresponding larger current capacity design features and elaborate arrangements of the electronic switch.

SUMMARY OF THE INVENTION

It is the object of this invention to provide a procedure for operating an uninterruptible power supply which permits high operating efficiency and low output losses. It is another object of this invention to provide a procedure for a simple decoupling of the uninterruptible bus from the power supply system in the event of system short-circuits, without requiring elaborate special designs for reliable operation of the load unit fuses. It is a further object of this invention to provide an apparatus to carry out these procedures. Briefly stated in accordance with one aspect of the invention, the aforementioned objects can be achieved by providing a procedure for an operation of uninterruptible power supply supplying power over an uninterruptible bus to an a.c. load (often a plurality of individual a.c. loads). As usual in the prior art, the procedure comprises the steps of connecting the a.c. load to the a.c. power supply network by closing a switch, and maintaining an energy storage unit at a fully charged level by a static converter arrangement connected to the storage unit, when the network status is changed to normal; disconnecting the plurality of a.c. loads from the a.c. power supply network by opening the switch, and supplying power to the plurality of a.c. loads from the storage unit by means of the static converter arrangement when the network status is changed to malfunctioning. According to the invention, the current flowing through the switch into the uninterruptible bus is conducted by means of an inductive arrangement having a variable effective inductive impedance, varied to a low value when said status changes to normal and varied to a high value when said status changes to malfunctioning.

In another aspect of the invention, these objects are achieved by providing an apparatus for an uninterruptible power supply of load units. The apparatus comprises: a switch connected between an a.c. power supply network and an uninterruptible bus connected to at least one load unit; a monitoring device monitoring an a.c. power supply network status, either normal or malfunctioning, of the a.c. power supply network and an energy storage unit status, either a completely charged status or not completely charged status of the energy storage unit. The energy storage unit is connected by means of the static converter to the uninterruptible bus and the monitoring device keeps the switch closed as long as the power network status is normal and controls the static converter in such a fashion that the energy storage unit is held at a nearly constant charge level, and said monitoring device opens said switch in the event the power system status changes to malfunctioning and regulates the static converter to provide an adequate supply voltage at the uninterruptible bus. The monitoring device reverses a controllable switching mechanism when the power network status changes to malfunctioning. The apparatus further comprises an inductance arrangement with the switch and the uninterruptible bus having an inductive impedance level effective on the current flowing between the power supply network and the uninterruptible bus, which is reversed by the switching mechanism.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
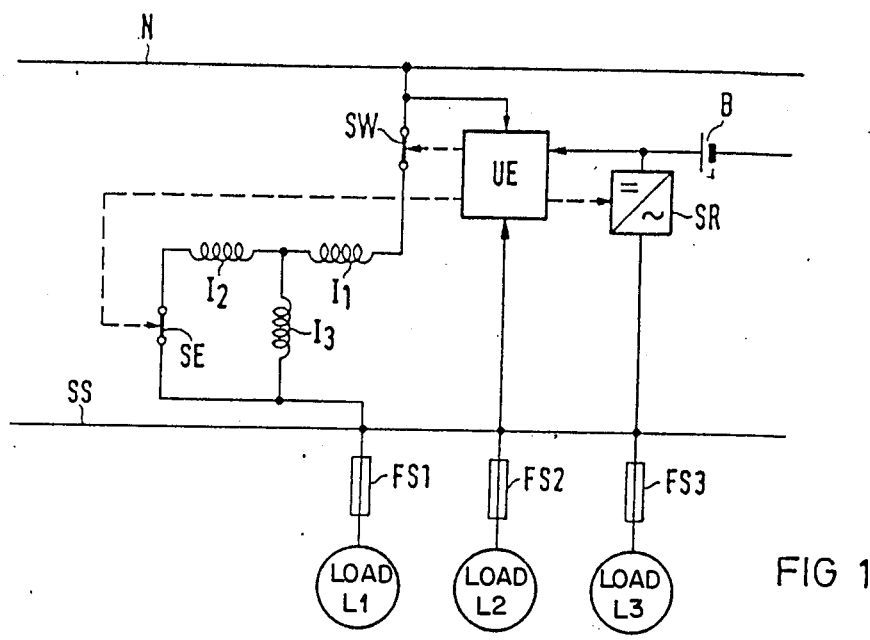
FIG. 1 shows a schematic diagram showing the function performed by the invention.

In accordance with FIG. 1, load units L1, L2 and L3 are connected to an uninterruptible bus SS via their fuses FS1, FS2, FS3. The status of an a.c. power supply network N is monitored by a monitoring device UE for malfunctions. Said malfunctions could either be sudden changes of frequency and phase, or unacceptable deviations of the amplitude (e.g., up to a complete breakdown of the power supply) from preset nominal values.

As long as the power supply system is functioning properly, a switch SW is held closed by the monitoring unit. Preferably said switch is not designed as an electronic switch, but as a breaker or contactor and thus has high current-carrying capacity. Said switch connects power supply network N with an inductive arrangement (coils I1, I2, I3) which supplies the uninterruptible bus SS as long as the power supply network is functioning properly.

In addition, there is a static converter arrangement SR which is similarly triggered by the monitoring device UE and as long as the network remains stable, maintains a battery B fully loaded as the energy storage unit. The monitoring device and static converter are preferably designed so that, for example, by means of an inverter model, ignition pulses can be generated by means of which the power supply to the uninterruptible bus can be transferred to the energy storage unit without delay; said ignition pulses remain inhibited, however, and the static converter is held simply in operating readiness as long as the energy storage unit remains fully loaded and the power supply network N continues functioning properly.

In case the power supply system begins to malfunction, the load units are separated from the power supply network N by the opening of switch SW and supplied from the energy storage unit B via static converter SR. A simple switch, particularly a relay, does not, however, permit quick interruption of the current flow between the power supply network and the uninterruptible bus in any phase position. For that reason, the inductive arrangement is to be designed so that the impedance level effective on the current flowing between the power supply system and uninterruptible bus can be reversed. For that purpose controllable, such as an electronic, switching mechanisms SE are incorporated. In the case shown the inductive impedance arrangement consists on the one hand of inductances I1, I2 and on the other hand of the substantially greater inductance I3, which are arranged so that when the switching mechanism SE is closed, the large inductance I3 is effectively short-circuited via inductance I2. When the power supply is functioning properly, only the low inductances I1 and I2 are effective, resulting in only slight power losses. A short-circuit in one of the load units L1 or L2 or L3 produces a largely unimpeded increase of the current through I1 and I2 until the corresponding load unit fuse is triggered.

In the event of a power supply network malfunction, however, the opening of switching mechanism SE permits the large inductance I3 to activate instead of the small inductivity I2. This now dampens an increase of the current flow from the uninterruptible bus in the direction of power supply network N so that neither the phase position of current and voltage nor the switchoff time of mechanical switch SW are critical.

The inductance coils I1, I2 and I3 shown in the arrangement in FIG. 1 correspond to the equivalent circuit diagram of a transformer. This makes clear that it is preferrable to use a transformer to produce the inductance arrangement required for the invention whose effective inductance can be reversed so that the value of the effective inductance given a properly functioning power supply network can be held small (e.g., voltage drop, $U_K$ approximately equals 5%), and reversed to a higher value when a malfunction arises.

Figure 2:
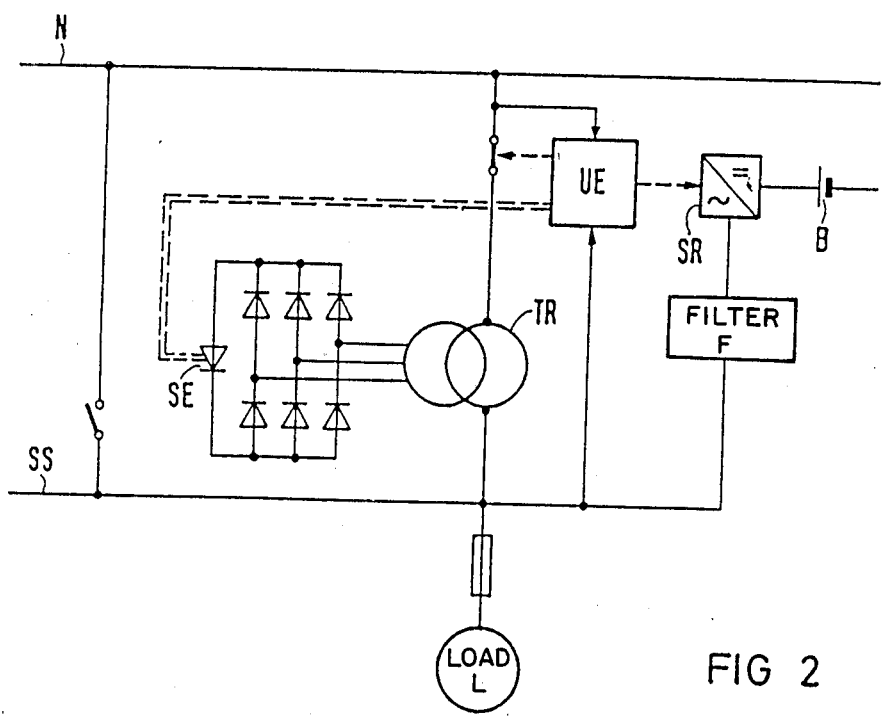
FIG. 2 shows a schematic diagram of a preferred embodiment of the invention.

A corresponding arrangement is shown in FIG. 2. The switching mechanism in this case is an electronic auxiliary switch, e.g., a direct d.c. converter or a turn-off-thyristor SE connected to the secondary winding of transformer TR by an uncontrolled rectifier bridge. In this design the transformer has no additional winding installed between the uninterruptible bus and the static converter SR, i.e., the inductive arrangement is not inductively coupled to the static converter and its connections. Rather, the energy storage unit B is coupled by the static converter SR to the uninterruptible bus only. As already noted, it is advantageous to use a pulse-controlled inverter designed for reversible operation functioning as a load controller and voltage stabilizer. This makes it possible to control the inverter by means of the monitoring device UE to maintain a constant output a.c. voltage. Furthermore, a filter F which, as already mentioned above, is preferably connected electrically in series before upstream of the load units, here is mounted between the static converter SR and the uninterruptible bus SS.

If in the arrangement according to FIG. 2 both the mechanical switch SW as well as the electronic switch SE are set to full closed with a properly functioning power network, then only the leakage inductance of transformer TR is effective. The resulting inductive voltage drop $U_k$ amounts, for example, to approximately 3 to 5 percent. If with a fully charged storage unit, operation of the inverter SR as a voltage stabilizer is not required, then the ignition pulses are inhibited and the energy loss occurring with the power network functioning properly consists primarily of a constant component due to the effect of filter F. To be added are current-dependent components due to both the inductances and to the electronic switch. Thus one can obtain the result that under full load the leakage power amounts to only approximately 3% of the nominal output.

If, however, it is necessary to operate the static converter SR to stabilize the voltage or for battery charging, then the corresponding converter losses also must be considered, whereby the leakage power could nearly double. In inverter operation, conversely, the filter and transformer determine constant components producing a leakage power of, for example, 5% at a nominal output of 40 kVA.

The device can relieve the power supply network from any reactive current load by having the static converter and storage unit functioning practically as phase shifters at the uninterruptible bus. In this context it is also possible to simultaneously draw the required active power from the power supply network to charge the storage unit, if necessary. This could, however, also produce parallel feeding from the power network and the storage unit to the load units.

This type of operation is advantageous in those situations in which a minimum value for the power factor has to be maintained when drawing current from the power network.

A weak power network could make it necessary, for example, at times when the power network has other major loads to supply, to reduce the output of the power network to the load units. This is similarly possible by a temporary parallel supply from the power network and from an approximately sized battery by means of an approximate control of the static converter. Said operation, in which despite proper operation of the power network the power drawn from the power network may be reduced all the way down to zero at the expense of the storage unit, is generally applicable to those cases in which the storage unit has to be completely discharged after extended periods of standby operation.

The described opening of the switch in which the effective impedance value of the inductance is reversed to the high value and the storage unit supplies the load units, is applicable in times of voltage peaks or voltage dips in the network. Said network malfunctions can be determined by monitoring the instantaneous values of the power supply network or supply voltage.

There are, however, power network conditions in which the power network voltage and thus the supply voltage attain or even exceed certain preset tolerance limits, but where a reactive power interchange with the storage unit can prevent the load unit voltage from attaining impermissible values. Said conditions can be detected by monitoring the effective value or a suitably smoothed measured value (e.g., average value) for the power network or supply voltage. In such cases the switch SW remains closed, and the effective inductive impedance is kept at a low value; the static converter, however, is controlled in accordance with the voltage deviation so that it can interchange the required reactive power between the load units and storage units to maintain the required load voltage. The power network then only compensates the reactive power balance of the uninterruptible bus and supplies the active power required for the load units and—if need be—to charge the battery.

When using a monitoring device and a static converter in which—given proper function of the power supply network—the static converter is maintained in complete readiness and can only be inhibited electronically by an ignition pulse interlock, a further advantageous option arises, i.e., to retain the static converter, given a charged-up storage unit and properly functioning power network, in this inhibited status and to connect it only when recharging of the battery becomes necessary. If, however, in case of voltage dips, for example, the SW switch is opened, then the static converter has to be opened for supplying power from the storage unit. Once the power network resumes its operation, the static converter remains in operation initially if required for recharging the storage unit.

It will now be understood that there has been disclosed an uninterruptible power supply apparatus and an improved procedure for operating it. As will be evident from the foregoing description, certain aspects of the invention are not limited to the particular details of the examples illustrated, and it is therefore contemplated that other modifications or applications will occur to those skilled in the art, for instance, three-phase uninterruptible power supplies. It is accordingly intended that the claims shall cover all such modifications and applications as do not depart from the true spirit and script of the invention.

What is claimed as new and desired to be secured by Letters Patent of the United States is:

1. A procedure for an operation of uninteruptible power supply supplying power over an uninterruptible bus to an a.c. load, said a.c. load being connectable to an a.c. power supply network by means of an inductive arrangement having a variable effective impedance and a switch in series with said inductive arrangement, the procedure comprising the steps of:

varying the effective impedance to a low value, closing said switch, and maintaining an energy storage unit at a fully charged level by a static converter arrangement connected to said storage unit, when said network status is changed to normal, and varying the effective impedance to a high value, opening said switch, and supplying power to said a.c. load from said storage unit by means of said static converter arrangement when said network status is changed to malfunctioning.

2. A procedure according to claim 1, further comprising the steps of opening said switch and reversing said effective inductive impedance when a voltage peak or a voltage dip occurs in said power supply network, and interchanging reactive power between said load and said power supply network by means of said static converter arrangement whenever an average load voltage exceeds preset tolerance limits, with said switch being closed and said effective inductive impedance held to said low value.

3. A procedure according to claim 2, further comprising said steps of holding said static converter arrangement in starting readiness with inhibited ignition pulses whenever said energy storage unit is fully charged and said power network status is normal; and switching said static converter arrangement on and recharging said energy storage unit when said storage unit charge level drops below a preset value with said switch closed.

4. An apparatus for an uninterruptible power supply of load units comprising:

a switch connected between an a.c. power supply network and an uninterruptible bus connected to at least one load unit;

a monitoring device monitoring an a.c. power supply network status, either normal or malfunctioning, of said a.c. power supply network and an energy storage unit status, either of a completely charged or not completely charged status of an energy storage unit;

said energy storage unit is connected by means of said static converter to said uninterruptible bus;

said monitoring device keeps said switch closed as long as said power network status is normal and controls said static converter in such a fashion that said energy storage unit is held at a nearly constant charge level, and said monitoring device opens said switch in said event said power system status changes to malfunctioning and regulates said static converter to provide an adequate supply voltage at said uninterruptible bus;

said monitoring device reverses a controllable switching mechanism when said power network status changes to malfunctioning; and an inductive impedance arrangement is provided between said switch and said uninterruptible bus having an inductive impedance level effective on a current flowing between said power supply network and said uninterruptible bus, which is varied by said switching mechanism.

5. An apparatus according to claim 4, wherein said inductive impedance arrangement further comprises two inductive impedances, one of which can be short-circuited by said switching mechanism.

6. An apparatus in accordance with claim 4, wherein said inductive impedance arrangement further comprises transformer having a primary winding connected between said switch and said uninterruptible bus and a secondary winding which can be shortcircuited through a rectifier (preferably an uncontrolled rectifier and switch) as said switching mechanism.

7. An apparatus according to claim 4, wherein said inductive impedance arrangement and said static converter arrangement have no inductive coupling.

8. An apparatus according to claim 4, wherein said energy storage unit is a d.c. voltage storage unit, specifically a battery, and said static converter is an inverter functioning in reversible operation, preferably a pulse-controlled inverter.

9. An apparatus according to claim 8, wherein said energy storage unit connected to the input of said static converter and the output of said static converter is connected only to said uninterruptible bus.

10. An apparatus according to claim 8, wherein said inverter is controlled to maintain a constant a.c. output voltage.

11. An apparatus according to claim 4, further comprising a filter connected between said static converter and said load units.

* * * * *